J. L. McMILLAN.
ENVELOP SEALING AND OPENING MACHINE.
APPLICATION FILED MAY 18, 1916.
1,317,517.
Patented Sept. 30, 1919.
4 SHEETS—SHEET 1.
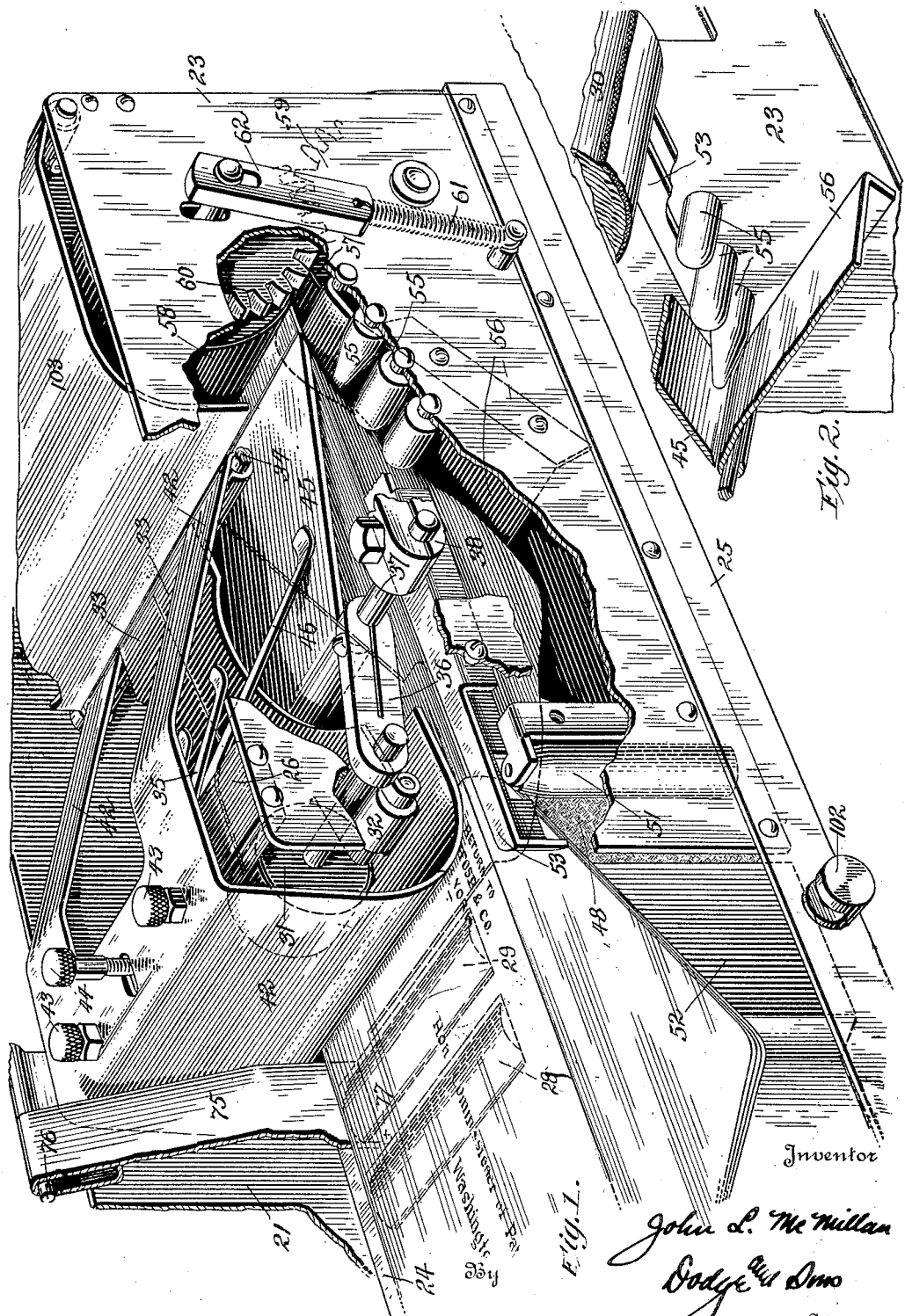

J. L. McMILLAN.
ENVELOP SEALING AND OPENING MACHINE.
APPLICATION FILED MAY 18, 1916.
1,317,517.
Patented Sept. 30, 1919.
4 SHEETS—SHEET 2.
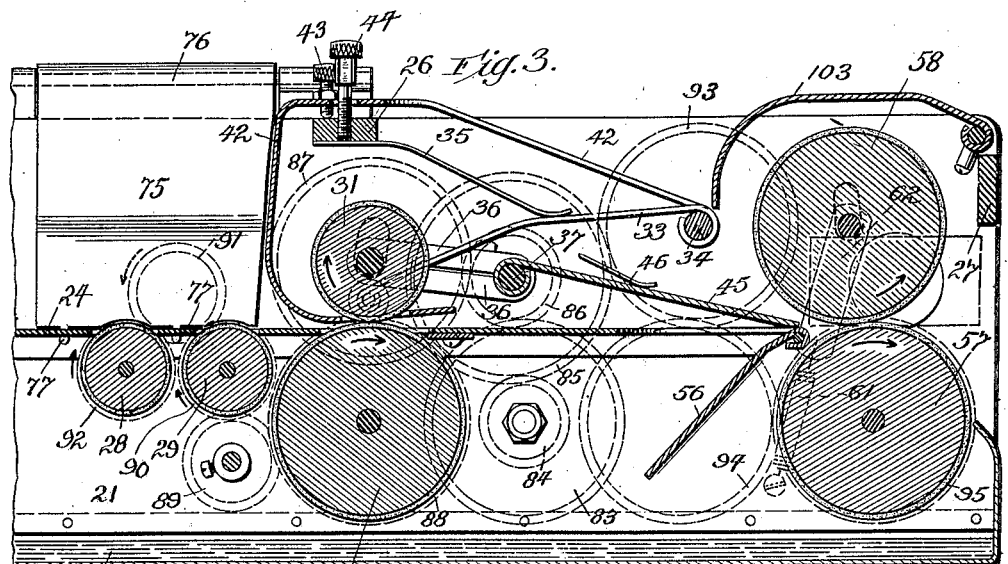
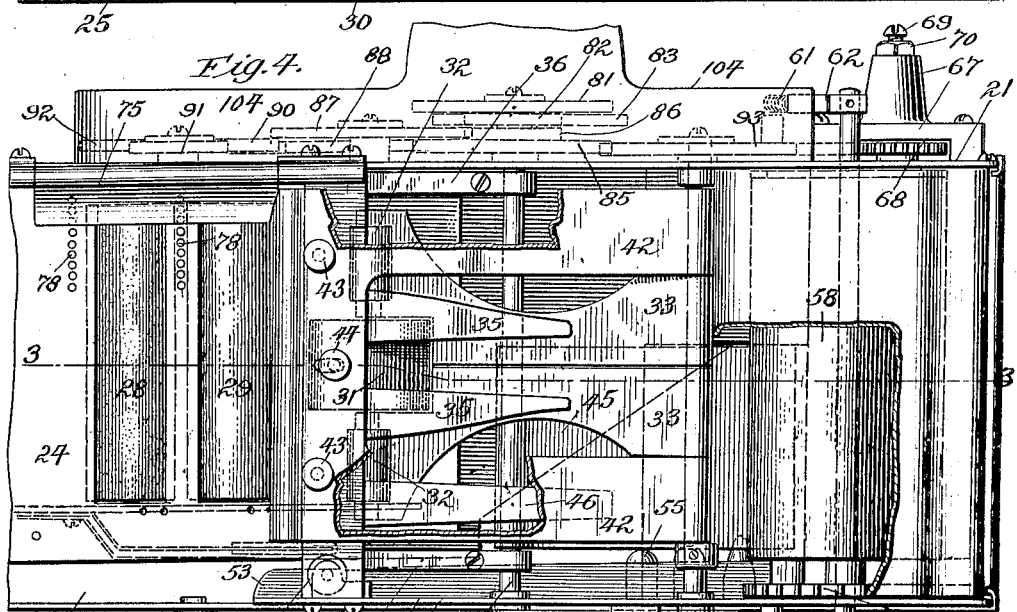
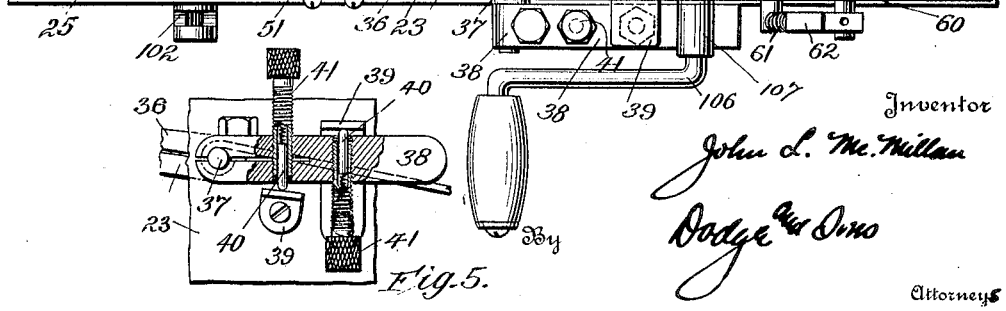
Inventor
John L. McMillan
By Dodge and Ono
Attorneys

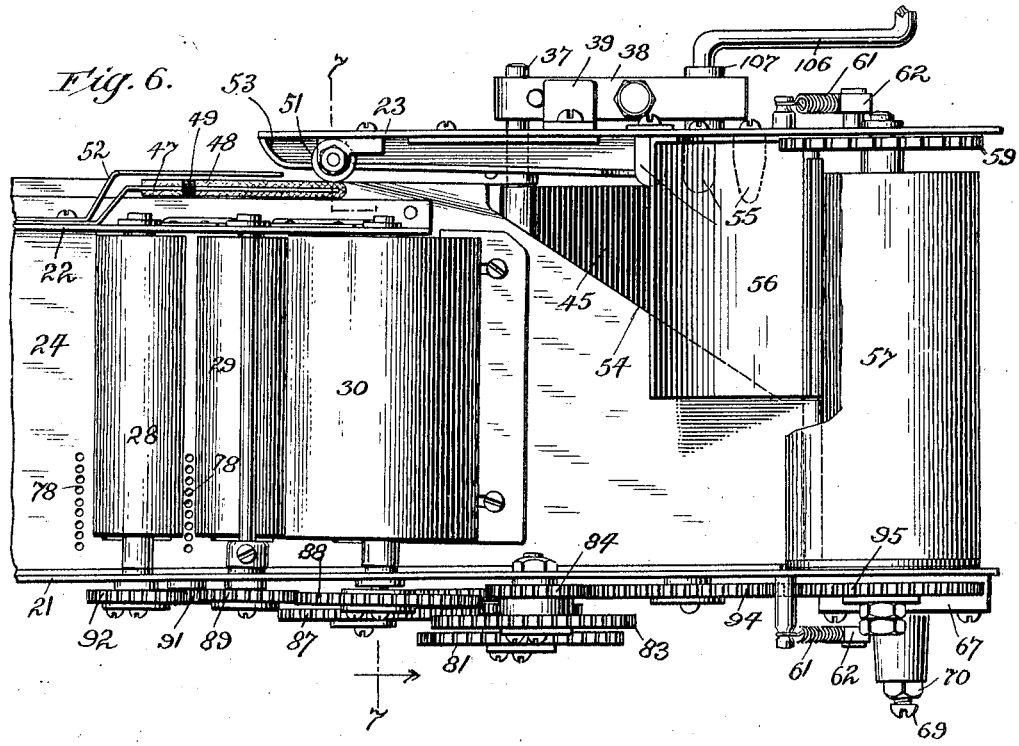

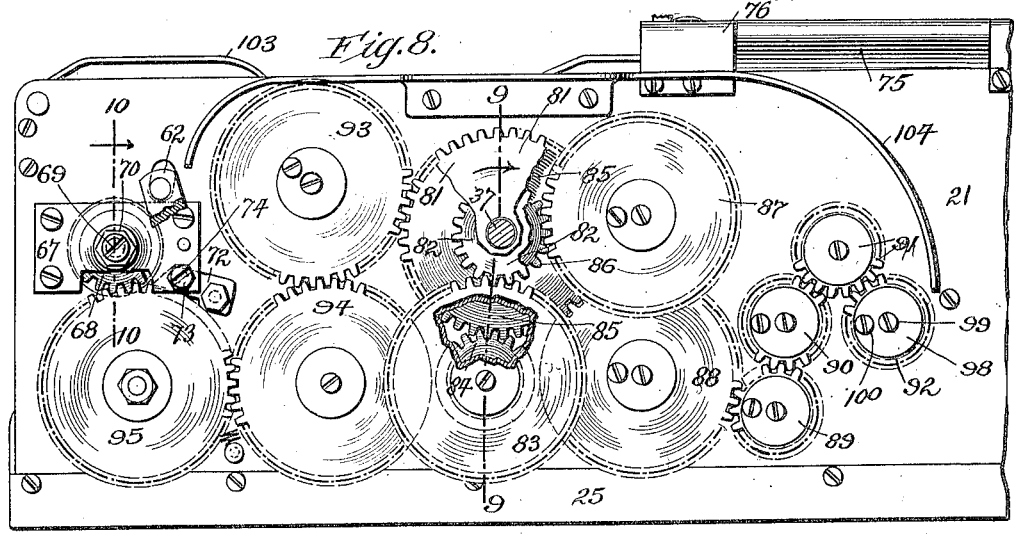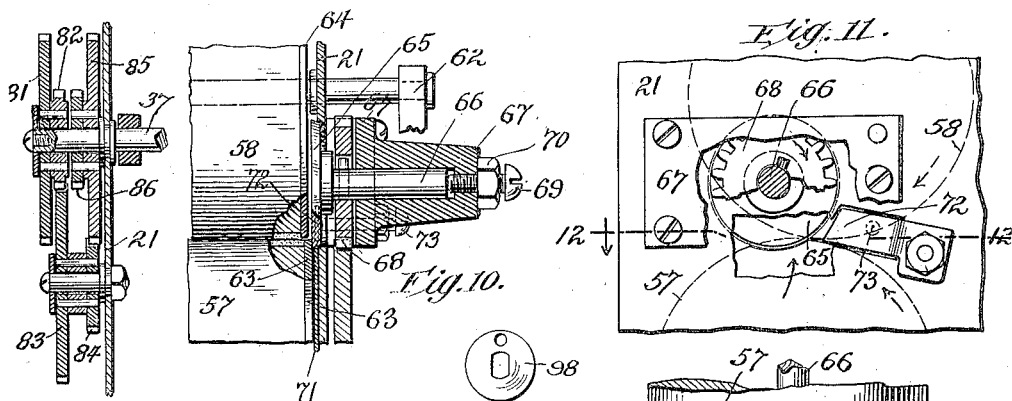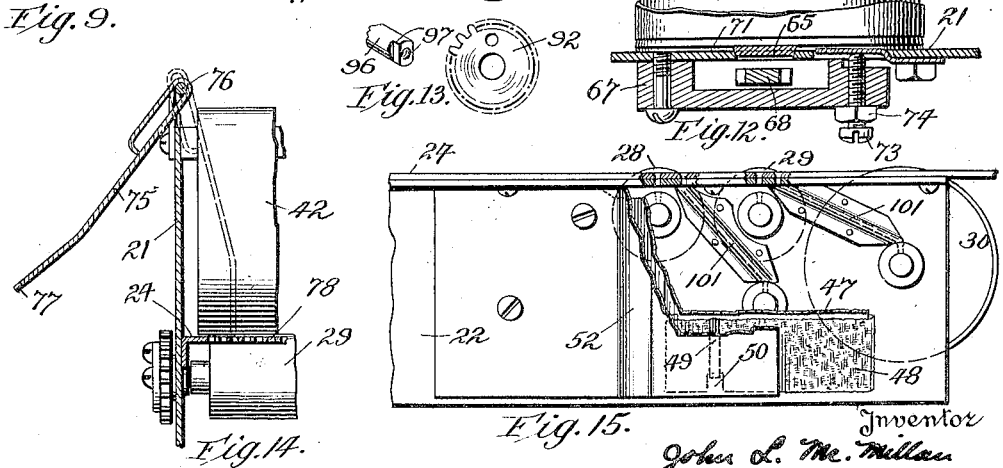

UNITED STATES PATENT OFFICE.

JOHN L. McMILLAN, OF SYRACUSE, NEW YORK.

ENVELOP SEALING AND OPENING MACHINE.

1,317,517.   Specification of Letters Patent.   Patented Sept. 30, 1919.

Application filed May 18, 1916. Serial No. 98,427.

*To all whom it may concern:*

Be it known that I, JOHN L. MCMILLAN, a citizen of the United States, residing at Syracuse, in the county of Onondaga and State of New York, have invented certain new and useful Improvements in Envelop Sealing and Opening Machines, of which the following is a specification.

This invention relates to machines for sealing or opening mail matter such as letters or the like inclosed in envelops.

The invention provides a single compact mechanism which will draw envelops successively from the bottom of a pile and feed them to a flap moistening and sealing device, or to an edge shearing device as may be required. The change of function is secured by the adjustment of a guide, which causes a single feeding mechanism to feed the envelops either to the sealing mechanism or to the shearing mechanism.

The sealing mechanism comprises a flap moistener, folding guides for turning down the moistened flap, and pressure rolls for securing adhesion of the flap to the body of the envelop. The opening device comprises a rotary shearing knife coacting with a rotary disk to shear a narrow strip or thread from the longitudinal edge fold of the envelop. To reduce the number of parts and secure a positive guiding of the envelop at the shearing knife, the rotary disk with which the knife coacts is carried by one of the pressure rolls, above mentioned as forming part of the sealing mechanism, the rolls and knife being so arranged that the shearing occurs on, or practically on, the line on which the envelop is gripped by the rolls. Though I prefer this arrangement for the reasons stated, it is obviously not necessary that the disk with which the knife coacts be carried by one of the pressure rolls, and I do not limit myself to such construction except as specified in the claims.

The envelop opening mechanism *per se* forms the subject matter of a divisional application, entitled Envelop opening machines, filed October 26, 1916, Serial No. 127,837, and hence is not specifically claimed herein, except in combination with the sealing mechanism.

The initial bottom feed rolls which start the envelops and feed them to the pressure rolls are set slightly askew so as to produce a slight lateral feeding tendency and hold the envelops against lateral guiding means in either operation. Feeding the envelops two or more at a time is prevented by a single backward turning top roll which does not have grip sufficient to overcome the feeding action of the bottom rolls, but which acting on the upper one of two or more envelops will overcome its adherence to the next lower and force it to stop and move backward into the pile until directly gripped by the bottom feed rolls.

In the drawings I illustrate a preferred embodiment of the invention.

Figure 1 is a perspective view of the principal portion of the device looking from the right, parts of the casing being broken away;

Fig. 2 is a fragmentary perspective showing the guides for turning or folding the envelop flaps;

Fig. 3 is a section on the line 3—3 of Figs. 4 and 7;

Fig. 4 is a plan view, certain parts being shown broken away;

Fig. 5 is a detail view of the adjustable spring pressing device for the back feeding roller;

Fig. 6 is a bottom view with the water tray removed;

Fig. 7 is a section on the line 7—7 of Fig. 6;

Fig. 8 is a view of the left side of the machine showing the gear train, certain of the gears being partly broken away;

Fig. 9 is a fragmentary section on the line 9—9 of Fig. 8;

Fig. 10 is a fragmentary section on the line 10—10 of Fig. 8, showing the mounting of the rotary shearing knife;

Fig. 11 is a fragmentary view partly in section transverse to the shaft on which the knife rotates;

Fig. 12 is a section on the line 12—12 of Fig. 11;

Fig. 13 is a detail view showing a pinion and its holding plate and a shaft end on which the two may be mounted;

Fig. 14 is a fragmentary section illustrating the adjustable guide for entering envelops; and Fig. 15 is a fragmentary section illustrating a part of the moistening pad and certain oil ducts.

The frame of the machine is composed principally of metal plates of suitable thickness connected together by cap screws and other suitable means. The general form will be apparent from an inspection of the drawings and many of its details are not material.

The principal parts are the left side plate 21; two right side plates 22 and 23 whose ends overlap and are offset so as to allow the entrance of envelop flaps between them; a platform plate 24 located below the top of the machine and extending from the side plate 21 to the top of the side plate 22 which is lower than the side plates 21 and 23; and a water retaining base pan 25. The side plates 21 and 23 are rigidly secured to the base pan 25 and are tied together by cross braces 26 and 27. The platform plate 24 is rigidly secured to the side plates 21 and 22 which latter it overhangs as shown. The entrance or front end of the machine being merely a supporting platform for envelops is shown partly broken away in the drawings. The end plate, which consequently does not appear in the drawings, braces the side plates 21 and 22 and the platform 24, as will be obvious.

The side plate 21 extends the whole length of the machine. The side plate 22 extends from the front of the machine to a point just beyond the feed rollers where it terminates to permit the inward folding of the envelop flaps. The side plate 23 extends forward from the rear of the machine far enough to overlap the rear end of plate 22 and thus inclose the moistening mechanism which is positioned between these plates. The platform plate 24 extends from the front of the machine over the feed rollers, whose tops project through openings therein, and terminates just short of the pressure rollers, between which it delivers the envelops passing over it.

The feeding mechanism, which is common to both the sealing and opening functions of the machine comprises four gear driven rollers, 28, 29, 30 and 31. All these are formed with wooden cores and tractive surfaces of rubber. Rollers 28 and 29 are alike and are placed below platform 24 with their tops just projecting through apertures in said platform. They are so located as to engage the entering end of the bottom envelop of a pile placed upon platform 24 to be fed into the machine and thus operate when rotated to draw the envelops one by one from the bottom of the pile and deliver them to the main feed roller 30. The feed roller 30 is larger than the rollers 28 and 29 but like them is positioned below platform 24 with its top projecting through an aperture in the platform. The rollers 28, 29, 30 are all skewed slightly so as to feed envelops slightly to the left as they pass in contact with the rollers and hold them against guiding means hereinafter described. (See Figs. 4 and 6).

The envelops are pressed against feed roll 30, not by roll 31 but by metal presser rolls 32 at either side of the relatively short roll 31. These rollers 32 are journaled in arms 33 hinged on shaft 34. The arms 33 are depressed by leaf springs 35 carried by cross bar 26 so that entering envelops are closely held against the roll 30 and are positively fed thereby.

The roll 31 rotates in the same direction as roll 30, but as it bears on top of the entering envelop it tends to oppose the entrance of envelops to prevent double feeding. The roll 31 is journaled in arms 36 fast on shaft 37. The shaft 37 carries an arm 38 adjustably clamped thereto, (see Fig. 5) and this arm swings between stops 39 on plate 23. Spring held plungers 40 coacting with the stops 39 are adjustable by means of the threaded cups 41 in which their springs are housed, and serve to adjust the normal position and resistance to displacement of the roller 31. This is so set by such adjustment as to enable the roller to reject an envelop "riding" on top of another without impeding the feed of single envelops. The use of opposed spring plungers increases the range of selective action by allowing wider range of movement of roller 31 without undue variation of its contact pressure.

A guide plate 42 is also hinged on shaft 34, projects thence forward over roll 31 and curving downward and to the rear extends between roller 30 and the overlying rollers 31 and 32. The plate 42 is of course provided with apertures through which the rollers 31 and 32 project and its curved front face preserves the alinement of the pile of envelops and guides the lowest one to the roller 30. The plate 42 also limits the thickness of envelop which may be fed to the roll 30. To adjust the range of movement of the plate, limit stops are provided in the shape of the screws 43 and 44.

A guide plate 45 is journaled on shaft 37 and projects thence rearward nearly to the nip of the main pressure rolls. It extends only over the right hand half of the platform plate 24 and is urged downward by the leaf spring 46. Its function is to guide unsealed envelops unerringly into the pressure rolls, by preventing their upward deflection by the flap turning action.

The envelop moistening device as already suggested is located between the overlapping ends of the plates 22 and 23. It consists of an offset resilient plate 47 of brass fastened at its forward end to plate 22 and carrying a strip of felt 48 folded about its rear end. This is held in place by a rubber band 49 engaging notches 50 in plate and felt. A roller 51 carried by plate 23 serves to force the entering envelop flaps against the felt. A cover plate 52 is provided to shield the forward edge of the felt and the rubber band 49 from contact with the envelop flaps. The lower edge of the felt dips into water contained in base pan 25 when the machine is in use, the upper portion of the felt being thus kept suitably moist by capillary action.

Envelops to be sealed are stacked face up on platform plate 24, with their flaps projecting downward along plate 22 (see Fig. 1). As the bottom envelop is drawn forward by rolls 28, 29 and 30 the forward end of the flap enters between plates 22 and 23, being guided partly by guide 53 and partly by the skew feeding action of the rolls slightly to the left. This motion to the left ceases when the flap at its crease engages the edge of plate 24. In this relation the flap is drawn between felt 48 and roller 51 and is moistened preparatory to sealing.

The flap turning mechanism is located directly to the rear of the moistener. The plate 24 is cut away along a diagonal line 54 (see Fig. 6), so as to leave a triangular opening extending to the rear end of plate 24 through which the envelop flap may swing up against the body of the envelop. A plurality of guide studs 55 (three being shown) are mounted on the plate 23 and engage the flap in its forward movement to give the initial turn, which is completed by an upwardly inclined plate 56 mounted beneath plate 24 and leading almost to the nip of the pressure rolls. The fingers 55 are at different elevations, as shown in Fig. 1, the last of the series being the highest or nearest to the under side of platform 24. Said fingers likewise project progressively farther from the plate 23 by which they are carried, as will be seen upon referring to Fig. 4. From this arrangement it follows that each finger will present its rounded end to the flap of the envelop, and by reason of their progressively increasing elevation and projection, the fingers will progressively turn said flap more and more inward and upward toward the under side of platform 24 until the envelop is finally drawn beyond said plate or platform 24, and passed between the sealing pressure rolls. By employing a plurality of fingers formed and arranged as described, each presents a single point of contact with the flap, and exerts a minimum retarding effect to the gliding of the flap over it. This avoids any extended surface contact, presenting only a minute contacting surface for the flap, and lessens the danger of the deposit of sufficient mucilage on any one of the fingers, through twisting or misplacing of a moistened flap, to materially retard the advance of an envelop, as would happen were an extended bearing surface employed. The plates 45 and 56 together with the fingers 55 thus guide the body and flap of the envelop into contact immediately in advance of the pressure rolls (see Fig. 2).

The pressure rolls 57 and 58 are at the rear of the machine and each is a wooden cored, rubber coated cylindrical roller. They are geared together by spur gears 59 and 60 whose pitch circles substantially coincide with the contacting surfaces of the rolls. The lower roll 57 is journaled in bearings in the plates 21 and 23. The upper roll 58 is journaled in slots in the same plates so as to be movable toward and from the roll 57. Tension springs 61 and yokes 62 act upon the journals of roll 58 to draw it against roll 57 with sufficient pressure to grip envelops firmly and produce sealing adhesion of moistened flaps to the body of the envelop.

The left hand ends of the rolls 57 and 58 are faced with steel disks 63 and 64 respectively. The disk 63 extends to the left beyond the disk 64 and coacts with a rotary shear knife 65 fast on a stub shaft 66. The shaft 66 turns in a housing 67 and carries splined upon it a driving gear 68. The face of the knife 65 is forced into shearing contact with the left face of disk 63 by a thrust bearing consisting of a set screw 69 and checknut 70. The axes of the knife and rolls are so arranged (see Fig. 11) that the shearing point is in line with the nip of the rolls 57 and 58. The knife 65 projects through an aperture in plate 21 and is housed partly in an aperture in a brass plate 71 which plate fills the space between plates 63 and 21 and strips from disk 63 the thread or strip sheared from the edge of the envelop. The direction of rotation of the knife 65 is indicated by an arrow in Fig. 11.

To regulate the width of the strip cut from the envelop by knife 65 I provide a resilient plate 72 which stands in advance of the knife and may be forced in from plate 21 by an adjusting screw 73 to reduce the width of the cut. A check nut 74 holds the screw 73 in its adjusted positions.

To assist in positioning the pile of unsealed envelops, and to prevent any of them from being fed to the shearing knife, I provide a guide plate 75 which has a pin and slot connection 76 with the top edge of plate 21. The lower edge of the plate 75 has two lugs 77 which may enter chosen holes in the two rows of holes 78 formed in plate 24 near the rollers 28 and 29. When envelops are to be sealed this guide plate is adjusted according to the width of the envelops. When envelops are to be opened the guide plate 75 is swung back to the full line position of Fig. 14. The envelops are then stacked with one longitudinal edge of each envelop against plate 21 and hence are fed to the shear knife.

The feed and pressure rolls drive in unison and the backing roll operates reversely as stated. The knife is driven at relatively high rotative speed. Various drive mechanisms may be used, but I prefer a spur gear train as simplest and best adapted to drive the slightly skewed feed rolls. I illustrate both electric motor and hand drives applied to the machine.

The electric motor 79 carries a gear 80 fast on its shaft. This meshes with a larger gear 81 to which is fast a pinion 82. The pinion 82 meshes with a larger gear 83 to which is fast a pinion 84, and the pinion 84 meshes with a larger gear 85. By this train a marked reduction of rotative speed is secured, the gears 81 and 85 turning in the same direction.

The axis of shaft 37 around which the back feeding roll 31 swings is coincident with the axis of gear 85. Accordingly the gear 85 carries a pinion 86 which meshes with a larger gear 87 fast on roller 31. The roller is thus driven relatively slowly.

The gear 85 meshes with a similar gear 88 fast on the shaft of feed roller 30. The gear 88 drives a train of identical pinions 89, 90, 91 and 92, pinions 89 and 91 being idlers, and pinions 90 and 92 being fast on the shafts of feed rollers 29 and 28 respectively. The pitch circles of gears 88, 90 and 92 are so related to the diameters of their respective rollers that the rate of lineal feed of the rollers is the same.

The gear 85 through two idler gears 93 and 94 drives gear 95 fast on the shaft of pressure roll 57. This gear 95 meshes with knife driving pinion 68. A proper relation of pitch circle to diameter of roller gives the pressure rollers 57 and 58 the same rate of feed as the feed rollers.

The mode of attaching gears and pinions fast to their shafts is illustrated in Figs. 8 and 13, with reference to pinion 92. The end of the roll shaft 96 has two shouldered flats 97. A washer 98 having a correspondingly shaped hole fits this shaft end and is held thereon by a cap screw 99 threaded into the end of the shaft. The pinion 92 placed on the shaft behind the washer is connected to the said washer by the cap screw 100. As indicated in the drawings this mode of attachment is used for various gears.

Oil ducts 101 may be provided where needed (see Fig. 15). A water overflow 102 for the pan 25 is provided. The roll 58 is protected by a hinged cover 103 and the gears by a curved gear guard 104 which may support the motor controlling switch 105. A hand crank 106 for operating the machine is removably mounted on the shaft 34 on which gear 93 is fixed, by threading it into a hub 107. Other minor details of construction may be understood from an inspection of the drawings.

When the machine is in use the rolls and knife are driven by the motor or crank through the gear train described. When envelops are to be sealed they are placed face up on plate 24 with their flaps extending downward, the stop 75 having first been adjusted to the width of the envelops. The machine draws the envelops in one by one, moistens and turns the flaps and then rolls the flaps into adhesive contact. When envelops are to be opened the stop 75 is swung back and the letters are bunched and their edges alined in a common plane. The letters are placed on platform plate 24 with these alined edges against plate 21. They are then fed by the machine one by one past the shearing knife, which cuts off a strip or thread just sufficient to open the envelop.

The various adjustments described are only occasionally required, but permit the adjustment of the operation of the machine occasionally required by wear or abuse, or by peculiar conditions of use.

Although I prefer a reversely driven roll 31 to prevent double feeding it is possible to omit the driving gears for this roll, and still have it perform its function. In this case the bearings for roll 31 are fitted rather tight and the roll then becomes a retarding or braking device acting on "riding" envelops to arrest them. Broadly considered the roll is a retarding means whether it be driven or not and I shall use this term in the claims to include equivalent devices for performing this characteristic retarding function.

Having thus described my invention, what I claim is:—

1. In a machine for opening and sealing envelops, the combination of a flap moistening device; pressure rolls for rolling the moistened flap into adhesive contact with the envelop; a shearing member carried by one of said rolls; a second shearing member coacting with the first named shearing member to shear the edge of an envelop gripped by said rolls; and means for guiding envelops to said rolls so as to be acted upon alternatively by either the flap moistening device or said shearing members.

2. In a machine for opening and sealing envelops, the combination of a flap moistening device; pressure rolls for rolling the moistened flap into adhesive contact with the envelop; a shearing member carried by one of said rolls; a rotary shearing knife coacting with said member to shear the edge of an envelop gripped by said rolls; and means for guiding envelops to said rolls so as to be acted upon alternatively either by the flap moistening device or said shearing knife.

3. In a machine for opening and sealing envelops, the combination of a flap moistening device; pressure rolls for rolling the moistened flap into adhesive contact with said envelop; shearing means for cutting the edge of an envelop gripped by said rolls; and means for guiding envelops to said rolls so as to be acted upon alternatively either by said flap moistening device or said shearing means.

4. In a machine for opening and sealing envelops, the combination of a single means for feeding envelops lengthwise through the machine; flap moistening and turning devices located at one side of the machine; an envelop cutting device at the opposite side of the machine; and guiding means for directing envelops in two alternative paths one leading to the flap moistening and turning devices and the other to the envelop cutting device.

5. In a machine for opening and sealing envelops, the combination of an envelop cutting device; flap moistening and turning devices located out of line with said cutting device; an envelop feeding means for feeding said devices and normally operating to deflect said envelops laterally away from said flap moistening and turning devices to said cutting device; and a guide associated with said moistening and turning devices for engaging envelop flaps to hold envelops against said lateral feeding tendency.

6. In a machine for opening and sealing envelops, the combination of an envelop cutting device; flap moistening and turning devices located out of line with said cutting device; a skewed feed roller for feeding envelops through said machine while normally deflecting the same away from said moistening and turning devices to said cutting device; and a guide for engaging envelop flaps to feed the same through said moistening and turning devices thereby holding the envelops against lateral deflection by the feed roller.

7. In a machine for opening and sealing envelops, the combination of a flap moistening device; pressure rolls for rolling the moistened flap into adhesive contact with the envelop; an envelop cutting device associated with said rolls and out of line with said moistening device; skewed feed rolls for feeding envelops to said pressure rolls while deflecting the same toward said cutting device; and a flap guide having a flap turning portion intermediate the moistening device and the pressure rolls and engaging the flap to prevent deflection of the envelop to said cutting device by the feed rolls.

8. In a machine for opening and sealing envelops, the combination of a flap moistening device; pressure rolls for rolling the moistened flap into adhesive contact with the envelop; a shearing plate on the end of one pressure roll; a rotary knife coacting with said shearing plate to cut envelops gripped by said rolls; skewed feed rolls for feeding envelops lengthwise to said pressure rolls while tending to deflect them laterally so as to encounter said knife; a flap turning guide between said moistening device and said pressure rolls; and a guide for engaging the fold of unsealed envelops to prevent the deflection of such envelops to said rotary knife.

9. A device for sealing envelops comprising in combination a supporting platform adapted to receive envelops face up, with their flaps overhanging the side of said platform; means for feeding envelops one by one lengthwise of said platform; flap moistening means beneath said platform in the path of said overhanging flaps; a plurality of flap-turning guide fingers located beyond said moistening means and projecting progressively farther inward relatively to the guiding edge of the platform; converging guide plates above and below said fingers; and pressure rolls for receiving said envelops as they discharge from between said plates.

10. A machine of the class described, including an envelop feed mechanism comprising a platform for supporting and guiding envelops; a feed roller projecting through said platform to act on the lower sides of envelops supported on said platform; a presser device for holding envelops in contact with said roller; an overhanging backwardly feeding roller for arresting superposed envelops by overcoming their adhesion to the lower envelop; a rising and falling support for said backwardly feeding roller; and opposed spring mechanisms for positioning said support.

11. A machine of the class described, including an envelop feed mechanism comprising a platform for supporting and guiding envelops; a feed roller projecting through said platform to act on the lower sides of envelops supported on said platform; a presser device for holding envelops in contact with said roller; an overhanging retarding device for arresting superposed envelops by overcoming their adhesion to the lower envelop; a rising and falling support for said retarding device; and opposed spring mechanisms for positioning said support.

In testimony whereof I have signed my name to this specification.

JOHN L. McMILLAN.